(12) United States Patent
Braun et al.

(10) Patent No.: US 10,183,426 B2
(45) Date of Patent: Jan. 22, 2019

(54) WATER AS A PROPELLANT FOR THERMOPLASTICS

(75) Inventors: Frank Braun, Ludwigshafen (DE); Frank Prissok, Lemförde (DE)

(73) Assignee: BASF SE, Ludwigshafen am Rhein (DE)

( * ) Notice: Subject to any disclaimer, the term of this patent is extended or adjusted under 35 U.S.C. 154(b) by 892 days.

(21) Appl. No.: 13/322,108

(22) PCT Filed: May 21, 2010

(86) PCT No.: PCT/EP2010/057035
§ 371 (c)(1),
(2), (4) Date: Nov. 22, 2011

(87) PCT Pub. No.: WO2010/136398
PCT Pub. Date: Dec. 2, 2010

(65) Prior Publication Data
US 2012/0065285 A1   Mar. 15, 2012

(30) Foreign Application Priority Data

May 26, 2009  (EP) .................................. 09161079

(51) Int. Cl.
*C08L 75/04* (2006.01)
*B29C 44/34* (2006.01)
*C08J 9/12* (2006.01)
*C08J 9/18* (2006.01)

(52) U.S. Cl.
CPC ...... *B29C 44/3446* (2013.01); *B29C 44/3453* (2013.01); *C08J 9/125* (2013.01); *C08J 9/18* (2013.01)

(58) Field of Classification Search
CPC .................................. C08J 9/18; C08J 9/125
USPC .................................................... 521/60, 76
See application file for complete search history.

(56) References Cited

U.S. PATENT DOCUMENTS

| | | | |
|---|---|---|---|
| 3,651,014 A | | 3/1972 | Witsiepe |
| 4,537,949 A | | 8/1985 | Schmidt et al. |
| 4,540,772 A | | 9/1985 | Pipper et al. |
| 4,613,629 A | | 9/1986 | Duchane et al. |
| 5,496,887 A | | 3/1996 | Braune |
| 5,908,894 A | * | 6/1999 | Genz .................. B29B 17/0042 521/49 |
| 6,342,540 B1 | | 1/2002 | Gluck et al. |
| 7,456,227 B2 | * | 11/2008 | Bleijenberg ............ C08J 9/125 521/146 |
| 8,642,670 B2 | * | 2/2014 | Mohmeyer ............ C08G 18/12 521/130 |
| 2006/0025489 A1 | * | 2/2006 | Yano ........................ C08J 9/125 521/99 |
| 2007/0197744 A1 | * | 8/2007 | Schadler .................... C08J 9/28 526/88 |
| 2007/0222105 A1 | * | 9/2007 | Brown .................... C08K 3/013 264/211 |
| 2008/0064772 A1 | * | 3/2008 | Bleijenberg ............ C08J 9/125 521/60 |
| 2009/0069526 A1 | * | 3/2009 | Henze ....................... A43B 1/14 528/65 |
| 2010/0047550 A1 | * | 2/2010 | Prissok .................. C08G 18/10 428/313.5 |
| 2010/0221474 A1 | | 9/2010 | Prissok et al. |
| 2010/0222442 A1 | | 9/2010 | Prissok et al. |
| 2010/0310833 A1 | | 12/2010 | Scherzer et al. |
| 2011/0021652 A1 | | 1/2011 | Mohrmeyer et al. |
| 2011/0042606 A1 | | 2/2011 | Braun et al. |
| 2011/0118373 A1 | | 5/2011 | Prissok et al. |
| 2012/0329892 A1 | * | 12/2012 | Prissok .............. C08G 18/4854 521/60 |

FOREIGN PATENT DOCUMENTS

| | | | | |
|---|---|---|---|---|
| DE | 2158608 A1 | 5/1973 | | |
| DE | 4401055 A1 | 7/1995 | | |
| EP | 0038582 A2 | 10/1981 | | |
| EP | 0039524 A1 | 11/1981 | | |
| EP | 129195 A2 | 12/1984 | | |
| EP | 129196 A2 | 12/1984 | | |
| EP | 299444 A2 | 1/1989 | | |
| EP | 1275687 A2 | 1/2003 | | |
| EP | 1347008 A2 | 9/2003 | | |
| JP | 08113664 A | * | 5/1996 | ............... C08J 9/18 |
| WO | WO-1994/020568 | 9/1994 | | |
| WO | WO-2007030719 A2 | 3/2007 | | |
| WO | WO-2007082838 A1 | 7/2007 | | |
| WO | WO-2008087078 A1 | 7/2008 | | |
| WO | WO 2010/149636 | 12/2010 | | |
| WO | WO 2011/073141 | 6/2011 | | |

OTHER PUBLICATIONS

U.S. Appl. No. 13/377,908, filed Dec. 13, 2011, Boudou et al.

* cited by examiner

*Primary Examiner* — Michael M Dollinger
(74) *Attorney, Agent, or Firm* — Drinker Biddle & Reath LLP

(57) ABSTRACT

The present invention relates to a process for the production of an expandable thermoplastic polymer comprising water as blowing agent, comprising at least the step (A) of storage of the thermoplastic polymer in water, so that water is absorbed by the thermoplastic polymer, in order to obtain an expandable thermoplastic polymer, to expandable thermoplastic polymer, obtainable via the process, to a corresponding expanded thermoplastic polymer, to a process for the production of a foam via foaming and fusion of the expanded thermoplastic polymer, and also to a foam, obtainable via said process.

14 Claims, No Drawings

WATER AS A PROPELLANT FOR THERMOPLASTICS

CROSS-REFERENCE TO RELATED APPLICATIONS

This application is a national stage application (under 35 U.S.C. § 371) of PCT/EP2010/057035, filed May 21, 2010, which claims benefit of European application 09161079.0, filed May 26, 2009, the contents of each of which are incorporated herein by reference in their entireties.

FIELD OF THE INVENTION

The present invention relates to a process for the production of an expandable thermoplastic polymer comprising water as blowing agent, comprising at least the step (A) of storage of the thermoplastic polymer in water, so that water is absorbed by the thermoplastic polymer, in order to obtain an expandable thermoplastic polymer, and also to a process for the production of an expanded thermoplastic polymer comprising said step (A) and at least the step (B) of evaporation of the water comprised in the thermoplastic polymer from step (A), in order to obtain an expanded, thermoplastic polymer.

BACKGROUND

There are known prior-art processes for the production of expandable or expanded thermoplastic polymers.

U.S. Pat. No. 6,342,540 B1 discloses a process for the production of expandable styrene polymers comprising water as blowing agent. For this, a polystyrene melt is mixed with water as blowing agent in the presence of an emulsifying aid in an extruder, and is extruded. The conduct of the process is complicated.

EP 1 347 008 A2 discloses a process for the production of expanded items of biodegradable plastics material, comprising the mixing of the plastics material in the molten state with water in an extruder, extrusion of the mixture, and cooling of the resultant extrudates.

WO 2007/030719 A2 discloses a process for the production of a polystyrene foam comprising a nanoclay free from modifiers. To produce said polystyrene foam, a mixture of water and of the clay mentioned is emulsified in a mixture composed of prepolymerized polystyrene and styrene, and this is followed by the polymerization of the prepolymer. The polystyrene foams are then produced via separation of the water present in the polymer.

WO 2008/087078 A1 discloses a hybrid system composed of foamed thermoplastic elastomers and polyurethanes, and also a process for its production. From this, the thermoplastic polyurethane in the form of granules is heated in a sealed reactor to above the softening point with water, with a suspending agent, and with a blowing agent. According to WO 2008/087078, organic liquids or inorganic gases, or a mixture of these, is/are used as blowing agent.

WO 2007/082838 A1 discloses foams based on thermoplastic polyurethanes, and also a process for their production. According to said document, the expanded thermoplastic polyurethane particles are produced via suspension or extrusion processes. In the case of the suspension process, the thermoplastic polyurethane in the form of granules is heated in a sealed reactor to above the softening point of the granules, with water, with a suspending agent, and with the blowing agent. The polymer particles here are impregnated with the blowing agent. Steam or hot air is used to foam said expandable particles.

In the process known from the prior art, a blowing agent is used for the foaming of the corresponding thermoplastic polymers, and suitable blowing agents here according to the prior art are organic liquids or organic or inorganic gases, examples being hydrocarbons, and gases such as nitrogen, carbon dioxide, etc. A disadvantage of said blowing agents is that they are toxic and/or inflammable. A further disadvantage of gaseous blowing agents is that the conduct of the process is complicated.

BRIEF SUMMARY

It is an object of the present invention to provide processes which can produce expandable thermoplastic polymers or expanded thermoplastic polymers and which use a blowing agent which is not toxic and not inflammable and, under standard conditions, not gaseous but liquid. A further object of the present invention consists in providing corresponding processes which feature particularly simple conduct of the process.

According to the invention, said objects are achieved via the process for the production of an expandable thermoplastic polymer comprising water as blowing agent, comprising at least the step of:
(A) storage of the thermoplastic polymer in water, so that water is absorbed by the thermoplastic polymer, in order to obtain an expandable thermoplastic polymer,
and also via the process for the production of an expanded thermoplastic polymer, comprising the abovementioned step (A) and at least the step of:
(B) evaporation of the water comprised in the thermoplastic polymer from step (A), in order to obtain an expanded, thermoplastic polymer.

The present invention provides a process for the production of an expandable thermoplastic polymer comprising water as blowing agents.

According to the invention, it is generally possible to use any of the thermoplastic polymers known to the person skilled in the art which are expandable. According to the invention, preference is moreover given to thermoplastic polymers whose physical or chemical structure makes them capable of absorbing the necessary amount of water for the process of the invention, for example by virtue of the presence of polar groups.

Preference is therefore given to thermoplastic polymers which comprise polar and/or ionic groups.

DETAILED DESCRIPTION OF THE PREFERRED EMBODIMENTS

In one preferred embodiment of the process of the invention, the thermoplastic polymer has been selected from the group consisting of polyurethanes, polyamides, polyesters, and mixtures of these, very particular preference being given to polyurethanes.

Suitable thermoplastic polyurethanes, hereinafter referred to by the abbreviated term TPUs, are known per se to the person skilled in the art. TPU and processes for its production have been widely described, for example by *Gerhard B. Becker and Dietrich Braun, Kunststoff Handbuch [Plastics Handbook], volume 7 "Polyurethane" [Polyurethanes]*, Carl Hanser Verlag Munich, Vienna, 1993.

All of the molar masses mentioned in this specification, stated in [kg/mol], are number-average molar mass.

In preferred embodiments, TPU is produced by reaction of a mixture of isocyanates (a) with compounds (b) reactive toward isocyanates, preferably with a molar mass of from 0.5 kg/mol to 10 kg/mol, and, if appropriate, with chain extenders (c), preferably with a molar mass of from 0.05 kg/mol to 0.5 kg/mol. In other preferred embodiments, for the production of TPU, at least one chain regulator (c1), and one catalyst (d) and, if appropriate, at least one filler, auxiliary, and/or additive are also added to the mixture. The substance groups denoted by the lower-case letters and, if appropriate, also by numerals are also termed components.

Components (a), (b), (c), (c1), (d), and (e) usually used during the production of the TPUs are described by way of example below and comprise the following groups of substances: isocyanates (a), compounds (b) reactive toward isocyanates, chain extenders (c), chain regulators (c1), catalysts (d), and/or at least one conventional filler, auxiliary, and/or additive.

TPU production always requires a mixture composed of isocyanates (a) and compounds (b) reactive toward isocyanates. The further addition of components (c), (c1), (d), and (e) is optional and can take place individually or by using any of the possible variants. Component here means an individual substance or a mixture of the substances within said component.

The components isocyanates (a), compounds (b) reactive toward isocyanates, and chain extenders (c), and also the chain regulators (c1), if they are used, are termed structural components.

In preferred embodiments, the organic isocyanates (a) used comprise aliphatic, cycloaliphatic, araliphatic, and/or aromatic isocyanates, and also preferred diisocyanates. Examples of preferred diisocyanates are tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4-and/or 1,3-bis(isocyanatomethyl)cyclohexane (HXDI), cyclohexane 1,4-diisocyanate, 1-methylcyclohexane 2,4-and/or 2,6-diisocyanate, and/or dicyclohexylmethane 4,4'-, 2,4'-, and 2,2'-diisocyanate, diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, and phenylene diisocyanate.

In preferred embodiments, the compounds (b) used that are reactive toward isocyanates comprise polyesterols, polyetherols, and/or polycarbonatediols, for which another customary general term is "polyols".

TPU is preferably produced from at least one polyether alcohol, and it is particularly preferable to use at least one polyetherdiol. Very particularly preferred polyetherdiols are polyethylene glycol and polypropylene glycol. The polyether alcohols are preferably used with a molar mass from 0.6 kg/mol to 2.5 kg/mol, particularly preferably with a molar mass from 1.2 to 1.9 kg/mol. The polyether alcohols are used individually or else in the form of a mixture of various polyether alcohols. According to the invention, polytetrahydrofuran is not suitable because its polarity is too low.

In alternative embodiments, TPU is produced from polyester alcohol. In one preferred embodiment, polyesterdiol is used for this purpose. One preferred polyesterdiol is produced from adipic acid and 1,4-butanediol. Preferred embodiments of the polyester alcohols have a molar mass from 0.6 kg/mol to 2.5 kg/mol.

In embodiments to which further preference is given, the average functionality of said polyols is from 1.8 to 2.3, more preferably from 1.9 to 2.2, in particular 2.

The chain extenders (c) used in preferred embodiments comprise aliphatic, araliphatic, aromatic, and/or cycloaliphatic compounds, which in embodiments to which further preference is given have a molar mass of from 0.05 kg/mol to 0.5 kg/mol. In some preferred embodiments, chain extenders (c) are compounds having two functional groups, for example diamines and/or alkanediols having from 2 to 10 carbon atoms in the alkylene radical, in particular 1,4-butanediol, 1,6-hexanediol, and/or di-, tri-, tetra-, penta-, hexa-, hepta-, octa-, nona-, and/or decaalkylene glycols having from 3 to 8 carbon atoms, and corresponding oligo- and/or polypropylene glycols. In further embodiments, mixtures of the chain extenders are used for the production of TPU.

Some embodiments use chain regulators (c1), usually with a molar mass of from 0.03 kg/mol to 0.5 kg/mol. Chain regulators are compounds which have only one functional group relevant to isocyanates. Examples of chain regulators are monohydric alcohols, monofunctional amines, preferably methylamine, and/or monohydric polyols. Chain regulators can be used to adjust flow properties as desired in the mixtures composed of the individual components.

The amount used of chain regulators in preferred embodiments is from 0% by weight to 5% by weight, more preferably from 0.1% by weight to 1% by weight, based on the compound b) reactive toward isocyanates. Chain regulators are used in addition to chain extenders or instead of these.

In further embodiments, at least one catalyst (d) is used for TPU production and in particular accelerates the reaction between the NCO groups of the diisocyanates (a) and the compounds reactive toward isocyanates, preferably hydroxy groups of structural components (b), (c), and (c1). In preferred embodiments, the catalyst has been selected from the group of the tertiary amines, e.g. triethylamine, dimethylcyclohexylamine, N-methylmorpholine, N,N'-dimethylpiperazine, 2-(dimethylaminoethoxy)ethanol, diazabicyclo[2.2.2]octane, and similar substances. In embodiments to which further preference is given, the at least one catalyst has been selected from the group of the organometallic compounds and examples that may be mentioned are titanic esters, an iron compound, e.g. iron(III) acetylacetonate, a tin compound, e.g. stannous diacetate, stannous dioctoate, stannous dilaurate, or a dialkyltin salt of an aliphatic carboxylic acid, e.g. dibutyltin diacetate, dibutyltin dilaurate, or the like.

Some embodiments use the catalysts individually, and other embodiments use mixtures of catalysts. In preferred embodiments, the amounts used of the catalyst or of the mixture of catalysts are from 0.0001% by weight to 0.1% by weight based on the compound (b) reactive toward isocyanates, preferably polyhydroxy compound. Hydrolysis stabilizers, such as polymeric and low-molecular-weight carbodiimides, can also be added to structural components (a) to (c) and, if appropriate, (c1), either alongside catalysts (d) or without use of catalysts.

In a further embodiment, the TPU can comprise a phosphorus compound. The phosphorus compounds used in one preferred embodiment comprise organophosphorus compounds of trivalent phosphorus, e.g. phosphites and phosphonites. Examples of suitable phosphorus compounds are triphenyl phosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, di(2,4-di-tert-butylphenyl) pentaerythritol diphosphite, tristearyl sorbitol triphosphite, tetrakis(2,4-di-tert-butylphenyl) 4,4'-diphenylene diphosphonite, triisodecyl phosphite, diisodecylphenyl phosphite, and diphenyl isodecyl phosphite, or a mixture thereof.

Particularly preferred embodiments comprise phosphorus compounds which are difficult to hydrolyze, because hydrolysis of a phosphorus compound to the corresponding acid can lead to damage to the polyurethane, in particular to the polyester urethane. Accordingly, particularly for polyester urethanes, suitable phosphorus compounds are those which are particularly hydrolysis-resistant. Preferred embodiments of hydrolysis-resistant phosphorus compounds are dipolypropylene glycol phenyl phosphite, triisodecyl phosphite, triphenyl monodecyl phosphite, triisononyl phosphite, tris (2,4-di-tert-butylphenyl)phosphite, tetrakis(2,4-di-tert-butylphenyl) 4,4'-diphenylene diphosphonite, and di(2,4-di-tert-butylphenyl)pentaerythritol diphosphite, or a mixture thereof.

For adjustment of the Shore hardness of TPU, the molar ratios of structural components (b) and (c) can be varied relatively widely. In preferred embodiments, the molar ratio of component (b) with respect to the total amount of chain extender (c) used varies from 10:1 to 1:10, preferably from 5:1 to 1:8, more preferably from 3:1 to 1:4, and the hardness of TPU here rises as content of chain extender (c) increases. Shore hardness values can thus be adjusted from A44 to D80, and particular preference is given to Shore hardnesses of from A44 to A90. Shore hardnesses are determined to DIN 53505.

In embodiments to which further preference is given, the reaction to give TPU takes place using conventional indices. The index is defined via the ratio of the total number of isocyanate groups used in component (a) during the reaction to the number of groups reactive toward isocyanates, i.e. active hydrogen atoms, in components (b) and (c). If the index is 100, there is one active hydrogen atom, i.e. one function reactive toward isocyanates, in components (b) and (c), for each isocyanate group in component (a). If the indices are above 100, there are more isocyanate groups present than groups reactive toward isocyanates, for example OH groups. In particularly preferred embodiments, the reaction to give TPU uses an index of from 60 to 120, and more preferably an index of from 80 to 110.

TPU is preferably produced by one of the known processes addressed below. Preferred embodiments are the continuous process, for example using reactive extruders, the belt process, the one-shot process, or the prepolymer process. Embodiments likewise preferred are the batch process or the prepolymer process. In these processes, reactant components (a) and (b) and also, if appropriate, (c), (c1), (d), and/or (e) can be mixed with one another in succession or simultaneously, whereupon the reaction of components (a) and (b) begins immediately. In the extruder process, structural components (a) and (b) and also, if appropriate, components (c), (c1), (d), and/or (e) are introduced individually or in the form of a mixture into the extruder and by way of example reacted at temperatures of from 100° C. to 280° C., preferably at from 140° C. to 250° C. The resultant TPU is extruded, cooled, and pelletized. It can, if appropriate, be advantageous to heat-condition the resultant TPU prior to further processing at from 80° C. to 120° C., preferably at from 100° C. to 110° C., for a period of from 1 to 24 hours, thus giving the mixture the opportunity to continue reaction at constant temperature.

The process of the invention can moreover use any of the polyamides which are known to the person skilled in the art and which are capable of absorbing a sufficiently large amount of water in step (A) of the process of the invention.

The intrinsic viscosity of suitable polyamides is generally from 70 to 350 ml/g, preferably from 110 to 240 ml/g, determined in 0.5% strength by weight solution in 96% strength by weight sulfuric acid at 25° C. according to ISO 307.

Examples of these are polyamides derived from lactams having from 7 to 13 ring members, such as polycaprolactam, polycapryllactam and polylaurinlactam, and polyamides obtained by reacting dicarboxylic acids with diamines. Dicarboxylic acids which may be employed are alkanedicarboxylic acids having from 6 to 12, in particular from 6 to 10, carbon atoms and aromatic dicarboxylic acids. Just a few of the acids that may be mentioned here are, adipic acid, azelaic acid, sebacic acid, dodecanedioic acid and terephthalic and/or isophthalic acid.

Particularly suitable diamines are alkanediamines having from 4 to 12, in particular from 6 to 8, carbon atoms, and also aromatic diamines, for example m-xylylenediamine, di(4-aminophenyl)methane, di(4-aminocyclohexyl)methane, 2,2-di(4-aminophenyl)propane or 2,2-di(4-aminocyclohexyl)propane.

Preferred polyamides according to the invention are polyhexamethylene adipamide, polyhexamethylene sebacamide, polycaprolactam and the nylon-6/6,6 copolyamides, especially with a proportion of from 5 to 95% by weight of caprolactam units.

Examples of other polyamides are those obtainable, for example, by condensing 1,4-diaminobutane with adipic acid at elevated temperature (nylon-4,6). Preparation processes for polyamides of this structure are described, for example, in EP-A 38 094, EP-A 38 582 and EP-A 39 524.

Polyamides which are obtainable by copolymerizing two or more of the abovementioned monomers, and mixtures of a number of polyamides in any desired mixing ratio, are also suitable.

Furthermore, semi-aromatic copolyamides such as PA 6/6T and PA 66/6T have proven particularly advantageous when their triamine content is less than 0.5% by weight, preferably less than 0.3% by weight (see EP-A 299 444).

The preferred semi-aromatic copolyamides with low triamine content can be prepared in accordance with the processes described in EP-A 129 195 and 129 196.

It is also possible according to the invention to use mixtures (blends) of these polyamides.

It is also possible to use polyamide block copolymers, examples being copolyetheramides and copolyesteramides. Products of this type are known per se commercially.

The process of the invention can also use, as thermoplastic polymer, any of the polyesters which are known to the person skilled in the art and which are capable of absorbing a sufficiently large amount of water in step (A).

Suitable polyesters are likewise known per se and described in the literature. They are generally based on aromatic and/or aliphatic dicarboxylic acids. Examples of aliphatic dicarboxylic acids are adipic acid, azelaic acid, sebacic acid, dodecanedioic acids, and cyclohexanedicarboxylic acids.

The main chain of preferred polyesters comprises an aromatic ring derived from an aromatic dicarboxylic acid. The aromatic ring can also have substitution, e.g. with halogen, such as chlorine and bromine, or with $C_1$-$C_4$-alkyl groups, such as methyl, ethyl, isopropyl, n-propyl, n-butyl, isobutyl or tert-butyl groups.

These polyesters may be prepared by reaction of aromatic dicarboxylic acids, in particular terephthalic acid and its isomers, their esters or other ester-forming derivatives thereof with aliphatic dihydroxy compounds, in a manner known per se.

Preferred dicarboxylic acids are naphthalene-2,6-dicarboxylic acid, terephthalic acid and isophthalic acid or mixtures of these. Up to 30 mol %, preferably not more than 10 mol %, of the aromatic dicarboxylic acids can be replaced by aliphatic or cycloaliphatic dicarboxylic acids, such as adipic acid, azelaic acid, sebacic acid, dodecanedioic acids and cyclohexanedicarboxylic acids.

Of the aliphatic dihydroxy compounds, preference is given to diols having from 2 to 6 carbon atoms, in particular 1,2-ethanediol, 1,4-butanediol, 1,6-hexanediol, 1,4-hexanediol, 1,4-cyclohexanediol, 1,4-cyclohexanedimethanol and neopentyl glycol or mixtures of these.

Polyesters that may be mentioned as particularly preferred for the process of the invention are polyalkylene terephthalates deriving from alkanediols having from 2 to 6 carbon atoms. Among these, particularly preference is given to polyethylene terephthalate and polybutylene terephthalate or a mixture of these.

The intrinsic viscosity of the polyesters that can be used according to the invention is generally from 60 to 220, preferably from 100 to 150, measured in 0.5% strength by weight solution in a phenol/o-dichlorobenzene mixture (ratio by weight 1:1) at 25° C.

Particular preference is given to polyesters whose carboxy end group content is up to 100 mmol/kg of polyester, preferably up to 50 mmol/kg of polyester, and in particular up to 40 mmol/kg of polyester. Polyesters of this type can by way of example be produced by the process of DE-A 44 01 055. Carboxy end group content here is usually determined via titration methods, e.g. potentiometry.

Another group which may be mentioned is that of fully aromatic polyesters which derive from aromatic dicarboxylic acids and/or aromatic dihydroxy compounds.

Suitable aromatic dicarboxylic acids are the compounds already described for the polyalkylene terephthalates. The mixtures preferably used are composed of from 5 to 100 mol % of isophthalic acid and from 0 to 95 mol % of terephthalic acid, in particular mixtures of from about 50 to about 80 mol % of terephthalic acid and from 20 to about 50 mol % of isophthalic acid.

The aromatic dihydroxy compounds preferably have the general formula

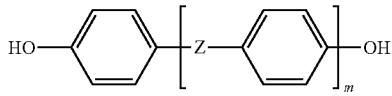

where Z is an alkylene or cycloalkylene group having up to 8 carbon atoms, an arylene group having up to 12 carbon atoms, a carbonyl group, a sulfonyl group, an oxygen or sulfur atom, or a chemical bond, and m is from 0 to 2. The phenylene groups of the dihydroxy compounds may also have substitution by $C_1$-$C_6$-alkyl or -alkoxy groups and fluorine, chlorine or bromine.

Examples of parent compounds are dihydroxybiphenyl, di(hydroxyphenyl)alkane, di(hydroxyphenyl)cycloalkane, di(hydroxyphenyl)sulfide, di(hydroxyphenyl)ether, di(hydroxyphenyl)ketone, di(hydroxyphenyl)sulfoxide, alpha,alpha'-di(hydroxy-phenyl)dialkylbenzene, di(hydroxyphenyl)sulfone, di(hydroxybenzoyl)benzene, resorcinol and hydroquinone, and also the ring-alkylated and ring-halogenated derivatives of these.

Among these, preference is given to 4,4'-dihydroxybiphenyl, 2,4-di(4'-hydroxyphenyl)-2-methylbutane, alpha,alpha'-di(4-hydroxyphenyl)-p-diisopropylbenzene, 2,2-di(3'-methyl-4'-hydroxyphenyl)propane, and 2,2-di(3'-chloro-4'-hydroxyphenyl)propane, and in particular to 2,2-di(4'-hydroxyphenyl)propane, 2,2-di(3',5'-dichlorodihydroxyphenyl)propane, 1,1-di(4'-hydroxyphenyl)cyclohexane, 3,4'-dihydroxybenzophenone, 4,4'-dihydroxydiphenyl sulfone and 2,2-di(3',5'-dimethyl-4'-hydroxyphenyl)propane and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters and copolyesteresters. Products of this type are known per se and are described in the literature, e.g. in U.S. Pat. No. 3,651,014. Corresponding products are also available commercially.

According to the invention, it is also possible to use mixtures of various thermoplastic polymers and/or of thermoplastic polymers having the same structure but different molar mass.

The expandable thermoplastic polymer that can be produced according to the invention can moreover comprise conventional additives known to the person skilled in the art, examples being those selected from the group consisting of nucleating agents, UV stabilizers, plasticizers, coating agents, hydrophobing agents, antioxidants, heat stabilizers, flame retardants, hydrolysis stabilizers, organic and/or inorganic pigments, athermanous particles, and mixtures of these.

The amount generally used of these optionally present additives is from 0.0001 to 20% by weight, preferably from 0.001 to 10% by weight, based in each case on the entire expandable thermoplastic polymer.

The thermoplastic polymers used in the process of the invention can have any three-dimensional shape known to the person skilled in the art. Preferred embodiments comprise thermoplastic polymers in the form of sheets, examples being sheets of thickness from 1 to 100 mm, thermoplastic polymers in the form of blocks, or particularly preferably appropriate particulate thermoplastic polymers in the form of particles or granules. Suitable particles or granules, and methods for their production, are known to the person skilled in the art and are described by way of example in "Handbuch der technischen Polymerchemie" [Handbook of technical polymer chemistry] by Adolf Echte, VCH (1993).

The present invention therefore preferably provides a process of the invention where the at least one thermoplastic polymer is used in the form of particles or granules in step (A).

Particularly preferred particles or granules composed of the thermoplastic polymers are by way of example spherical with a diameter from 0.1 to 10 mm, preferably from 0.2 to 5 mm.

Step (A):

Step (A) of the process of the invention for the production of an expandable thermoplastic polymer comprising water as blowing agent comprises the storage of the thermoplastic polymer in water, so that water is absorbed by the thermoplastic polymer, in order to obtain an expandable thermoplastic polymer.

According to the invention, "storage of the thermoplastic polymer" means that the thermoplastic polymer is brought into contact with water, so that the percentage of the surface area of the thermoplastic polymer that is in direct contact with water is preferably at least 50%, particularly preferably at least 80%. In one preferred embodiment, this is achieved by immersing the corresponding thermoplastic polymer in the three-dimensional shape mentioned, for example in the form of particles or granules, in water, so that the thermoplastic polymer is preferably completely surrounded by water. According to the invention, this can be achieved in any of the apparatuses or reactors which the person skilled in the art knows to be suitable, for example in a stirred tank.

In a preferred embodiment of the process according to the present invention step (A) is conducted by the suspension process.

Therefore, the present invention also relates to the process according to the present invention wherein step (A) is conducted by the suspension process.

With the suspension process, the thermoplastic polymer is in general heated as a granulate with water, a suspension additive and a blowing agent in a closed reactor up to the softening point of the granulate. Doing so, the polymer particles are impregnated with the blowing agent.

Suitable blowing agents for this preferred embodiment of step (A) are preferably inorganic compounds, for example selected from the group consisting of nitrogen, air, carbon dioxide, ammonia, inert gases and mixtures thereof.

The amount of the mentioned blowing agent or a mixture thereof is preferably 0.1 to 40, particularly preferably 0.5 to 35 and in particular preferably 1 to 30 parts by weight, in respect of 100 parts by weight of thermoplastic polymer present.

The suspension process is in general conducted step by step in an impregnating container, for example in a stirring reactor. The thermoplastic polymer, e.g. as mini granulate is introduced into the reactor, furthermore, water and a further suspension medium and the blowing agent and optionally a suspension additive, respectively. Suitable suspension additives are water soluble, inorganic stabilizers like tricalcium phosphate, magnesium pyrophosphate, metal carbonate, further polyvinylalcohol and surfactants like sodiumdodecyl arylsulfonate. They are in general used in amounts of 0.005 to 10% by weight, in respect of the thermoplastic polymer.

The thermoplastic polymer which has been impregnated by the preferred suspension process can be expanded in step (B).

According to the invention, step (A) of the process of the invention can use water purified by way of example by distillation, demineralization, or osmosis, or the type of mains water or drinking water that is known per se, comprising, for example, foreign substances in the form of mineral substances.

In one preferred embodiment of the process of the invention, the ratio by weight of thermoplastic polymers to water in step (A) is from 0.01 to 1, particularly preferably from 0.1 to 0.8.

The storage in step (A) of the process of the invention is carried out for a period which is judged in such a way that the at least one thermoplastic polymer absorbs a sufficient amount of water, as a function of the thermoplastic polymer used, the shape and size of the polymers used in the form of sheets or of particles, and the temperature and/or pressure.

It is preferable that the period of storage in step (A) is from 1 to 300 h, preferably from 2 to 200 h, particularly preferably from 4 to 170 h.

The temperature at which step (A) of the process of the invention is carried out is generally from 5 to 90° C., preferably from 10 to 60° C., particularly preferably from 20 to 40° C., for example ambient temperature.

If the preferred suspension process is used, the temperature at which step (A) is conducted is in general at least 90° C. The impregnation temperature should be near the softening temperature of the thermoplastic polymer. Preferred are impregnating temperatures of 90 to 300° C., in particular 100 to 250° C.

The pressure at which step (A) of the process of the invention is carried out is generally from 0.5 to 5 bar, preferably from 0.8 to 2 bar, particularly preferably from 0.9 to 1.2 bar, for example atmospheric pressure.

If the preferred suspension process is used, a pressure is obtained (impregnating pressure) in the sealed reactor which is depending on the amount and kind of blowing agent and on the temperature, and is in general 2 to 100 bar (absolute). If necessary, the pressure can be regulated by a pressure control valve or repressing of blowing agent.

The period for which step (A) of the process of the invention is carried out is generally sufficiently long to allow the thermoplastic polymer to absorb an amount of water adequate to permit its conversion, in an optional subsequent expansion step, to an expanded thermoplastic polymer with desired properties. In one preferred embodiment of the process of the invention, the water content of the expandable thermoplastic polymer after step (A) is at least 5% by weight, preferably at least 10% by weight, particularly preferably at least 15% by weight. The maximum water content is generally 200% by weight, preferably 150% by weight. The water content after step (A) is determined via the increase in weight of the thermoplastic polymer stored in water.

An advantage of the process of the invention, comprising step (A), is that water, which is entirely free from any toxicological or technological hazard, can be introduced as blowing agent into the thermoplastic polymer. An advantage here is that the distribution of the water in the product from step (A) is preferably completely homogenous, with the result, inter alia, that expansion of the expandable thermoplastic polymer produced according to the invention gives an expanded polymer with particularly uniform, i.e. homogeneous, density distribution.

After step (A) of the process of the invention, the resultant expandable thermoplastic polymer can be freed from any adherent surface water by way of example by mechanical wiping or drying in a convection dryer, e.g. a pneumatic dryer.

The present invention also provides an expandable thermoplastic polymer obtainable via the process of the invention. The features and preferred embodiments mentioned relating to the process apply correspondingly to the expandable thermoplastic polymer.

The present invention also provides a process for the production of an expanded thermoplastic polymer, comprising step (A) of the invention and at least the step of:

(B) evaporation of the water comprised in the thermoplastic polymer from step (A), in order to obtain an expanded, thermoplastic polymer.

This process of the invention serves for the production of an expanded thermoplastic polymer from the expandable thermoplastic polymer produced according to step (A).

The present invention therefore also provides a process for the production of an expanded thermoplastic polymer, comprising at least the steps of:
(A) storage of the thermoplastic polymer in water, so that water is absorbed by the thermoplastic polymer, in order to obtain an expandable thermoplastic polymer, and
(B) evaporation of the water comprised in the thermoplastic polymer from step (A), in order to obtain an expanded, thermoplastic polymer.

The evaporation of the water comprised in the thermoplastic polymer, according to step (B) of the process of the invention, can be achieved via establishment of a suitable temperature and/or of a suitable pressure. By virtue of the temperature prevailing in step (B), the water present is heated, so that it at least to some extent evaporates, and the expandable thermoplastic polymer from step (A) is thus converted into an expanded thermoplastic polymer via the volume increase associated with the at least some extent of evaporation. The evaporation process can be additionally promoted via optional application of a pressure below atmospheric pressure.

The heating according to step (B) of the process of the invention can generally be achieved by any of the methods known to the person skilled in the art, examples being steam, hot air, organic heat-transfer agents, such as mineral oils, exposure to high-frequency radiation, such as microwave radiation, or a combination of said methods.

In one preferred embodiment of the process of the invention, the evaporation in step (B) is achieved via high-frequency irradiation. This dielectric radiation can generally operate by using microwaves in the frequency range from 0.2 GHz to 100 GHz. Frequencies of 0.915, 2.45, and 5.8 GHz are available industrially, and particular preference is given here to 2.45 GHz.

The source of dielectric radiation is a magnetron, and it is also possible to use a plurality of magnetrons simultaneously for irradiation purposes. Distribution of the field should be as homogeneous as possible during the irradiation process.

The irradiation process is advantageously carried out in such a way that the power absorbed by the thermoplastic polymer obtained in step (A) is from 1 to 400 kW, preferably from 5 to 300 kW, in each case based on 1 kg of water in the polymer. If less power is absorbed, no foaming takes place. If operations are carried out within the range mentioned, the mixture foams more rapidly as the power absorbed increases. Above about 400 kW per kg of water, there is no further substantial increase in foaming rate.

In an embodiment to which further preference is given, the evaporation according to step (B) is achieved by using steam to treat the expandable thermoplastic polymer comprising water as blowing agent. The present invention therefore also provides the process of the invention where the evaporation in step (B) is achieved via treatment with steam at a temperature of from 100 to 200° C.

This can generally be achieved in any of the reactors known to the person skilled in the art, for example in a pressure-tight reactor, such as a pressure prefoamer. In one particularly preferred embodiment of the process of the invention, the expandable thermoplastic polymer which was obtained in step (A) and which preferably takes the form of granules is therefore charged, in step (B), to a pressure prefoamer and then treated with steam.

The thermoplastic polymer obtained in step (A) is heated in step (B) of the process of the invention, in order to evaporate, at least to some extent, the water in the thermoplastic polymer, in order to obtain an expanded thermoplastic polymer.

For the purposes of the present invention, "evaporate at least to some extent" means that at least 60% by weight, preferably at least 70% by weight, particularly preferably at least 80% by weight, of the water absorbed in step (A) is evaporated in step (B).

Step (B) of the process of the invention is therefore generally achieved at a temperature of from 60 to 200° C., preferably from 80 to 180° C., particularly preferably from 100 to 160° C.

The temperature of the steam preferably used in step (B) is generally from 100 to 200° C., preferably from 110 to 180° C., particularly preferably from 120 to 170° C.

Step (B) is generally carried out until the expansion process has given the expanded thermoplastic polymer a desired density. By way of example, the bulk density of preferred particles produced from expanded thermoplastic material is from 10 to 600 g/L, preferably from 15 to 500 g/L, particularly preferably from 20 to 400 g/L.

In a preferred embodiment, step (B) of the process according to the present invention can be conducted in a way that the hot suspension from step (A) is expanded abruptly without cooling (explosion expansion process), wherein the softened, blowing agent containing particles foam directly into the expanded particles, see for example WO 94/20568.

This preferred embodiment of step (B) of the process according to the present application is preferably conducted, if in step (A) the preferred suspension process is used.

The present invention therefore preferably relates to the process according to the present invention, wherein step (B) is conducted in a way that a hot suspension from step (A) is expanded abruptly without cooling.

In this preferred embodiment of step (B) the suspension is in general expanded through a jet nozzle, a valve or another suitable apparatus. One can expand the suspension directly to atmospheric pressure, for example 1013 mbar. In a preferred embodiment, it is expanded into a transfer tank, which pressure is suitable for foaming of the particles of thermoplastic polymer, but which may be above atmospheric pressure. Suitably, one expands to a pressure of for example 0.5 to 5, in particular 1 to 3 bar (absolute). During expansion, the impregnating pressure in the impregnating container can be hold constantly by repressing blowing agent. In general, one cools the suspension after expanding, separates off the expanded particles of thermoplastic polymer from the suspension additive, removes adhering suspension additive before or after, and washes and dries the particles at all.

The diameter of the particles preferably obtained in step (B), composed of an expanded thermoplastic polymer, is preferably from 0.5 to 15 mm, particularly preferably from 0.7 to 10 mm, very particularly preferably from 1 to 8 mm.

The present invention also provides an expanded thermoplastic polymer obtainable via the process of the invention. The features and preferred embodiments mentioned in relation to the process apply correspondingly to the expanded thermoplastic polymer.

The expandable thermoplastic polymer produced in step (A) or the expanded thermoplastic polymer produced in step (B) can by way of example be processed in further steps to give foams. Processes for this purpose are known to the person skilled in the art, an example being prefoaming of the expandable thermoplastic polymers in a first step using steam in open or closed prefoamers to give the corresponding expanded styrene polymers, and fusion of the expanded thermoplastic polymers, preferably in the form of particles or beads, in gas-permeable molds, by means of steam to give moldings or sheets.

The present invention therefore also provides a foam that can be produced from the expandable or expanded thermoplastic polymer of the invention. The features and preferred embodiments mentioned in relation to the process apply correspondingly to the foam. The density of the foam of the invention is generally from 5 to 1000 g/l, preferably from 10 to 600 g/l.

EXAMPLES

Example 1

100 parts by weight of thermoplastic polyurethane A (see table 1 for constitution) in the form of granules with average diameter 3 mm are stored for 48 h in 250 parts by weight of water. The granules are then removed and the adherent surface water is removed via drying in a stream of air. The increase in weight resulting from storage in water is 60% by weight, based on the starting granules. The granules containing water are treated for 20 s with 10 bar steam in a pressure prefoamer, whereupon they expand. The bulk density of the expanded particles is 300 g/L.

Example 2

100 parts by weight of thermoplastic polyurethane B (see table 1 for constitution) in the form of granules with average diameter 3 mm are stored for 48 h in 250 parts by weight of water. The granules are then removed and the adherent water is removed via drying in a stream of air. The increase in weight resulting from storage in water is 2% by weight, based on the starting granules. The granules containing water are treated for 20 s with 10 bar steam in a pressure prefoamer, whereupon they do not expand.

TABLE 1

| | Constitution [mol] | | | | |
|---|---|---|---|---|---|
| TPU | Polyethylene glycol (1650 g/mol) | PTHF[a] (1000 g/mol) | Butane-1,4-diol | 4,4'-MDI[b] | Shore hardness (DIN 53505) |
| A | 0.61 | — | 2.11 | 2.72 | A85 |
| B | — | 1.00 | 1.60 | 2.60 | A85 |

[a]Polytetrahydrofuran
[b]4,4'-Diphenylmethane diisocyanate

The invention claimed is:

1. A process for the production of an expandable thermoplastic polymer consisting of polyurethane comprising water as single blowing agent, comprising at least the step of:
    (A) immersing of a thermoplastic polymer consisting of thermoplastic polyurethane in water for a period of 1 to 300 hours, so that water is absorbed by the polyurethane, in order to obtain an expandable polyurethane, wherein after step (A), the water content of the expandable polyurethane is at least 5% by weight;
    wherein the thermoplastic polyurethane has a Shore hardness according to DIN 53505 of A85 to D80 and is made from components consisting of:
    (a) at least one organic isocyanate,
    (b) at least one compound reactive toward isocyanates that is a polyether diol and is selected from the group consisting of polyethylene glycol, polypropylene glycol, and mixtures thereof,
    (c) optionally a chain extender having two functional groups selected from the group consisting of diamines, alkane diols having 2 to 10 carbon atoms in the alkylene radical, dialkylene glycols having 3 to 8 carbon atoms, trialkylene glycols having 3 to 8 carbon atoms, and tetraalkylene glycols having 3 to 8 carbon atoms,
    (c1) optionally a chain regulator,
    (d) optionally at least one catalyst used for thermoplastic polyurethane production, and
    (e) optionally fillers, auxiliaries, and/or additives.

2. A process for the production of an expanded thermoplastic polymer consisting of polyurethane, comprising step (A) according to claim 1 and at least the step of:
    (B) evaporating the water comprised in the thermoplastic polymer consisting of polyurethane from step (A), in order to obtain an expanded polyurethane.

3. The process according to claim 1, wherein, in step (A), the ratio by weight of thermoplastic polymer consisting of thermoplastic polyurethane to water is from 0.01 to 1.

4. The process according to claim 2, wherein the evaporating step (B) takes place via treatment with steam at a temperature of from 100 to 200° C.

5. The process according to claim 2, wherein the evaporating step (B) takes place via high-frequency irradiation.

6. The process according to claim 1, wherein the at least one thermoplastic polymer consisting of thermoplastic polyurethane is used in step (A) in the form of particles or granules.

7. The process according to claim 2, wherein step (B) is conducted in a way that the hot suspension from step (A) is expanded abruptly without cooling.

8. The process according to claim 1, wherein the polyether diol has a molar mass of from 0.6 to 2.5 kg/mol.

9. The process according to claim 1, wherein the polyether diol has a molar mass of from 1.2 to 1.9 kg/mol.

10. The process according to claim 1, wherein:
    the chain regulator is selected from the group consisting of monohydric alcohols, monofunctional amines, monohydric polyols, and combinations thereof;
    the at least one catalyst is selected from the group consisting of tertiary amines, organometallic compounds, and combinations thereof; and
    the fillers, auxiliaries and/or additives are selected from the group consisting of nucleating agents, UV stabilizers, plasticizers, coating agents, hydrophobing agents, antioxidants, heat stabilizers, flame retardants, hydrolysis stabilizers, organic pigments, inorganic pigments, athermanous particles, and mixtures thereof.

11. The process according to claim 10, wherein the at least one compound reactive toward isocyanates is polyethylene glycol.

12. The process according to claim 1, wherein the thermoplastic polymer is immersed in water for a period of 48 to 300 hours.

13. The process according to claim 1, wherein the chain extender is selected from the group consisting of diamines, alkane diols having 2 to 10 carbon atoms in the alkylene radical, dialkylene glycols having 3 to 8 carbon atoms, and trialkylene glycols having 3 to 8 carbon atoms.

14. The process according to claim 1, wherein the chain extender is selected from the group consisting of diamines, alkane diols having 2 to 10 carbon atoms in the alkylene radical, and dialkylene glycols having 3 to 8 carbon atoms.

* * * * *